United States Patent [19]

Shibuya et al.

[11] Patent Number: 4,740,854
[45] Date of Patent: Apr. 26, 1988

[54] FLEXURE SEAT FOR A TRANSDUCER HEAD OF A MAGNETIC DISK APPARATUS

[75] Inventors: Hiroshi Shibuya, Kunitachi; Jun Makabe, Higashimurayama, both of Japan

[73] Assignee: Teac Corporation, Tokyo, Japan

[21] Appl. No.: 917,991

[22] Filed: Oct. 14, 1986

[30] Foreign Application Priority Data

Oct. 14, 1985 [JP] Japan ................... 60-229345

[51] Int. Cl.⁴ .................. G11B 5/48; G11B 21/20; G11B 21/12
[52] U.S. Cl. ........................... 360/104; 360/105
[58] Field of Search ................ 360/104, 103, 105

[56] References Cited

U.S. PATENT DOCUMENTS

| | | | |
|---|---|---|---|
| 4,058,843 | 11/1977 | Gyi | 360/103 |
| 4,089,029 | 5/1978 | Castrodale et al. | 360/99 |
| 4,151,573 | 4/1979 | Tandon et al. | 360/104 |

Primary Examiner—Robert S. Tupper
Attorney, Agent, or Firm—Woodcock Washburn Kurtz Mackiewicz & Norris

[57] ABSTRACT

For resiliently supporting a transducer head on a carrier member, such as a head carriage or a load arm pivoted thereon, that is movable radially of a flexible magnectic disk, a flexure seat is provided which is fabricated from resilient sheet metal material. The flexure seat comprises a central portion of circular or polygonal shape on which the transducer head is to be fixedly mounted, a peripheral portion surrounding the central portion and to be secured to the head carrier member, and several bridge portions interconnecting the central and peripheral portions at points angularly spaced from one another about the center of the central portion. Each bridge portion comprises two deflective strips of approximately the same length extending along the periphery of the central portion substantially in parallel relation to each other and joined to each other each at one extremity thereof. The other extremities of the deflective strips are joined respectively to the central portion and to the peripheral portion. So configured, the bridge portions permit the transducer head on the central portion to be resiliently displaced only in a direction normal to the principal plane of the flexure seat and, therefore, to that of the magnetic disk.

5 Claims, 6 Drawing Sheets

FLEXURE SEAT FOR A TRANSDUCER HEAD OF A MAGNETIC DISK APPARATUS

BACKGROUND OF THE INVENTION

Our invention relates broadly to apparatus having one or two transducer heads for data transfer with one or both sides of a record medium such as a flexible magnetic disk, or a floppy disk according to common parlance, that may be housed in a protective envelope to make up a disk cartridge. More specifically, our invention pertains to a flexure seat for use in such apparatus for resiliently supporting the transducer head or either or both of the two transducer heads.

Flexible magnetic disks may be described as being either single or double sided depending upon one or both sides of the disk are used for data transfer. Double sided disks are, of course, preferable from the standpoint of greater capacity. Devices having a pair of transducer heads for data transfer with such double sided magnetic disks are described and claimed in Castrodale et al. U.S. Pat. No. 4,089,029 and Tandon et al. U.S. Pat. No. 4,151,573. In the Castrodale et al. apparatus the transducer heads are both gimbal supported on a carriage composed of two parts of symmetrical design with respect to the plane of the magnetic disk intervening therebetween. So supported, the transducer heads can closely follow the unavoidable undulations or perturbations of the disk and cause little disk wear. However, when the disk plane considerably deviates from its normal plane, the gimbaled transducer heads are very easy to go off the track. We also object to the gimbal supporting of transducer heads as they are susceptible to rolling and pitching during data transfer, making difficult the high density recording of data on the magnetic disk.

With a view to minimal mistracking, Tandon et al. suggests the rigid mounting of one transducer head on a carriage movable radially of the magnetic disk, and the gimbaling of the other transducer head on a load arm pivoted on the carriage. Although mistracking is certainly reduced by this known arrangement, we nevertheless object to it, particularly to the fixed mounting of one transducer head. The position of the magnetic disk with respect to the fixed head is subject to change with the dimensional errors of the disk drive mechanism or of the disk cartridge itself. Therefore, as both heads are loaded against the disk, the latter must be elastically deformed into data transfer contact with the fixed head by the application of a high loading pressure. The high loading pressure is a cause of rapid disk wear. As an additional drawback the gimbaled head gives rise to problems similar to those set forth previously in conjunction with the gimbaling of both heads.

It will have been seen from the foregoing discussion of the prior art that the transducer heads should be resiliently supported for displacement only in a direction perpendicular to the plane of the magnetic disk. We designed an experimental flexure seat which we thought was capable of so supporting a transducer head. In the form of a unitary piece of resilient sheet metal material, the experimental flexure seat comprised a central portion of circular shape, an annular peripheral portion surrounding the central portion with a spacing therefrom, and three or more deflective bridge portions interposed at constant angular spacings from each other between the central and peripheral portions for interconnecting them. The central portion was intended to have a transducer head fixedly mounted thereon, and the peripheral portion to be secured to the carriage or the load arm. Each bridge portion took the form of a relatively slender strip of arcuate shape extending through an angle of, say, approximately 60 degrees about the axis of the central portion, joined at its opposite extremities to the central and peripheral portions. Extending along the periphery of the central portion, the bridge portions were highly deflective to permit large displacement of the central portion, and therefore of the transducer head thereon, in a direction normal to the principal plane of the flexure seat.

However, we found a fatal defect in this experimental flexure seat. Being joined at its opposite extremities to the central and peripheral portions, each bridging strip deflected about its joint to the peripheral portion upon displacement of the central portion in the direction normal to the principal seat plane, thereby giving rise to concurrent rotary displacement of the central portion. Such rotary displacement of the central portion, and hence of the transducer head thereon, is objectionable as it results in mistracking.

SUMMARY OF THE INVENTION

We have endeavored to improve the above described experimental flexure seat and hereby discovered how to support a transducer head in a magnetic disk apparatus so as to permit its displacement in a direction normal to the plane of the magnetic disk, with little or no rotary or angular displacement of the head brought about at the same time.

Briefly, our invention may be summarized as a flexure seat for resiliently supporting a transducer head on a relatively stiff carrier member such as a head carriage or a load arm. Fabricated unitarily from resilient sheet metal material and generally disposed in a principal plane that is substantially parallel to the principal plane of the magnetic disk at least during the progress of data transfer, the flexure seat comprises a central portion for carrying the transducer head, a peripheral portion to be secured to the carrier member, and a plurality of bridge portions joining the central and peripheral portions. Constituting the gist of this improved flexure seat are the bridge portions which interconnect the central and peripheral portions at points angularly spaced from one another about the geometric center of the central portion so as to permit the transducer head thereon to be resiliently displaced only in a direction normal to the principal plane of the flexure seat. Each bridge portion comprises two deflective strips of approximately the same length extending substantially in parallel relation to each other along the periphery of the central portion. The two deflective strips are united together each at one extremity thereof, and the other extremities are anchored respectively to the central and peripheral portions.

It is, of course, the elastic deformation of the bridge portions that enables the central portion to be displaced perpendicular to the principal seat plane relative to the peripheral portion. Deflecting with the perpendicular displacement of the central portion, the two substantially parallel strips of each bridge portion function to offset each other's displacement in a direction tending to cause rotary displacement of the central portion in its own plane. The bridge portions can, however, be sufficiently deflective to permit large displacement of the transducer head on the central portion in a direction normal to the plane of the magnetic disk. Since the bridge portions are elongated circumferentially, rather than radially, of the central portion, the flexure seat can be conveniently small in size to obtain the required large displacement of the transducer head.

The above and other features and advantages of our invention and the manner of realizing them will become more apparent, and the invention itself will best be understood, from a study of the following description and appended claims, with reference had to the attached drawings showing some preferable embodiments of our invention.

DESCRIPTION OF THE PREFERRED EMBODIMENTS

Figure 1:
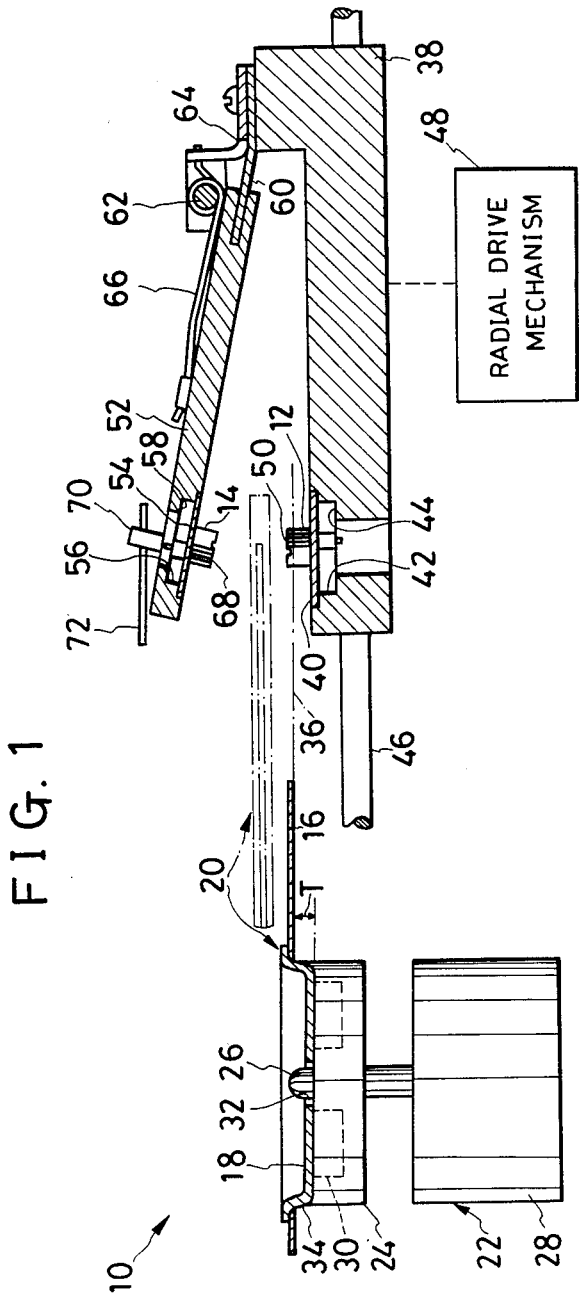
FIG. 1 is a diagrammatic, fragmentary vertical section, partly in elevation for illustrative convenience, showing the arrangement of some essential parts of a typical magnetic disk apparatus to which our invention is applicable, the apparatus having a pair of transducer heads each supported by the flexure seat of our invention, with both transducer heads shown out of data transfer contact with the magnetic disk.
Figure 2:
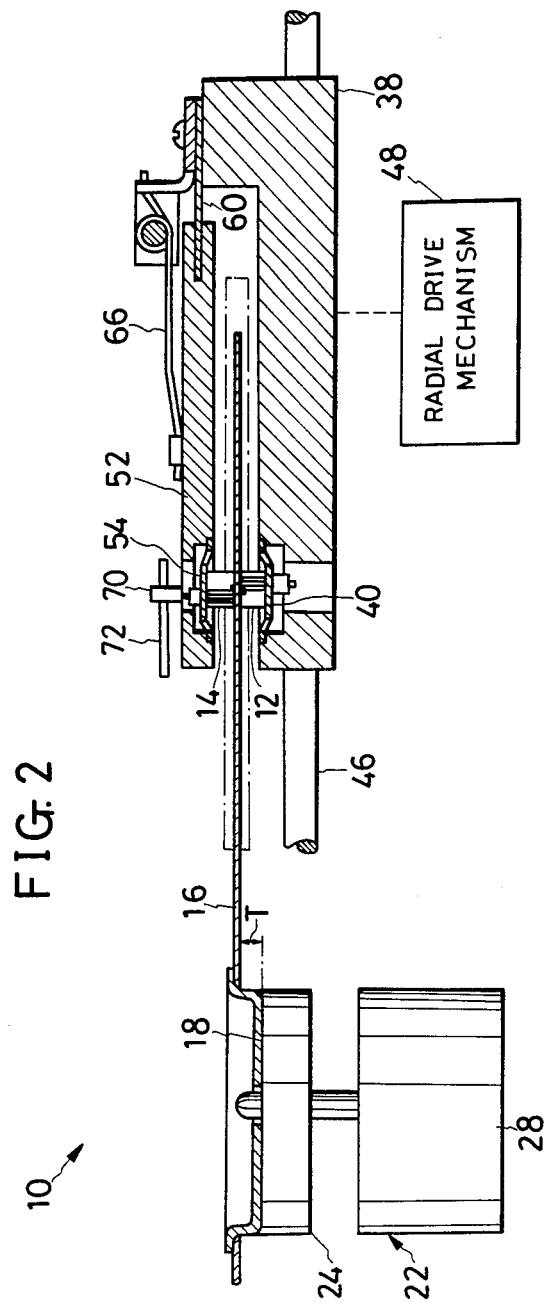
FIG. 2 is an illustration similar to FIG. 2 except that the transducer heads are shown loaded against the magnetic disk for data transfer therewith.

We will now describe our invention in detail as adapted for the magnetic disk apparatus 10 of FIGS. 1 and 2 having a pair of transducer heads 12 and 14 for data transfer with both sides of a flexible magnetic disk 16. This magnetic disk is centrally provided with a metal made hub 18 and rotatably enclosed in a relatively rigid envelope or housing to make up a conventional disk cartridge 20. A disk drive mechanism 22 for imparting rotation to the magnetic disk 16 is also conventional, including a turntable 24 nonrotatably mounted on a spindle 26 which in fact is the armature shaft of an underlying electric disk drive motor 28. The turntable 24 has a permanent magnet or magnets 30 embedded therein to attract the metal made hub 18 of the magnetic disk 16. The spindle 26 protrudes upwardly of the turntable 24 and is engaged in a hole 32 in the disk hub 18 for centering purposes. Further a drive pin, not shown, is erected eccentrically on the turntable 24 and is engaged in with the disk hub 18 for transmitting the rotation of the turntable to the magnetic disk 16.

It will be noted that metal made hub 18 of the magnetic disk 16 has some depth dimension in a direction normal to the plane of the magnetic disk. Further the magnetic disk 16 is so attached to this hub 18 that a difference T in height exists between the top 34 of the turntable 24 and the plane 36 of the magnetic disk 16 mounted in position thereon.

Figure 3:
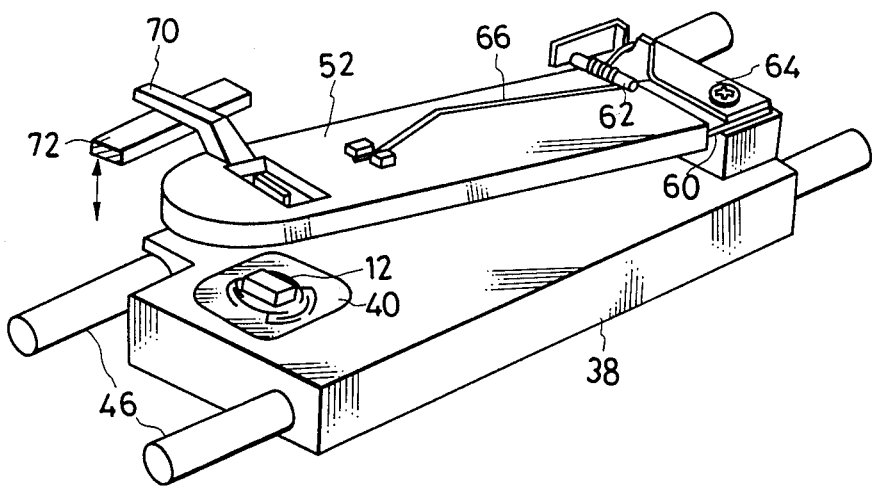
FIG. 3 is a perspective view showing in particular the carriage and the load arm hingedly mounted thereon, in the magnetic disk apparatus of FIGS. 1 and 2, to which the transducer heads are mounted via the flexure seats of our invention.

Reference is directed also to FIG. 3 for the description of the transducer heads 12 and 14 and their carrying, guiding and loading means. The transducer heads 12 and 14 may both be of the familiar tunnel erase configuration. We will later refer to the construction of the transducer heads 12 and 14 in some more detail in connection with the flexure seats resiliently supporting them in accordance with our invention. The lower transducer head 12 is mounted on a carrier member, herein shown as a carriage 38 of relatively stiff plastic material, via a flexure seat 40 of our invention to be detailed subsequently. Suffice it to say for the moment that the flexure seat 40 resiliently supports the transducer head 12 for displacement only in a direction normal to the plane 36 of the magnetic disk 16. A stepped hole 42 is defined in the carriage 38 to permit such displacement of the transducer head 12, with the step 44 functioning to limit the head displacement.

The carriage 38 is slidably mounted on a pair of parallel guide rods 46 for movement in a radial direction of the magnetic disk 16 by being driven by a radial drive mechanism 48. We have shown the radial drive mechanism 48 in block form because of its conventional and well known nature; in practice, this mechanism may comprise an electric stepping motor in conjunction with means for translating its incremental rotation into the linear stepwise travel of the carriage 38. So driven, the carriage 38 transports the transducer heads 12 and 14 from track to track on the magnetic disk 16.

An inspection of FIG. 1 will reveal that, mounted on the carriage 38 via the flexure seat 40 as above, the lower transducer head 12 has its gapped contact surface 50 disposed above the plane 36 of the magnetic disk 16 when the upper transducer head 14 is held away from the disk. Consequently, when the upper transducer head 14 lands on, and is loaded against, the magnetic disk 16 as shown in FIG. 2, the lower transducer head 12 is resiliently displaced downwardly and coacts with the upper head to firmly engage the disk therebetween.

The upper transducer head 14 is mounted on another carrier member, herein shown as a load arm 52 of relatively stiff plastic material, via another flexure seat 54 of the same construction as the first recited flexure seat 40. The load arm 52 has also defined therein a hole 56, complete with a step 58, to permit the displacement of the upper transducer head 14 within limits. The load arm 52 is hingedly mounted on the carriage 38 via a cantilever spring 60 for pivotal movement between a head unloading position of FIG. 1 and a loading position of FIG. 2. The cantilever spring 60 biases the load arm 52 from the unloading toward the loading position. Coiled about a mandrel 62 protruding from a fixed retainer 64 on the carriage 38, a torsional load spring 66 one of its arms held against the load arm 52 for exerting thereon the force required for loading both transducer heads 12 and 14 against the magnetic disk 16. The resulting pressure under which the upper transducer head 14 is loaded against the magnetic disk 16 when the load arm 52 is in the loading position of FIG. 2 is approximately equal to the pressure under which the lower transducer head 12 is so loaded. The two transducer heads 12 and 14 are in alignment when the load arm 52 is in the loading position, with the gapped data transfer surface 68 of the upper head held against the data transfer surface 50 of the lower head via the intervening magnetic disk 16. There is, however, a slight offset in the gap positions of the heads 12 and 14 in order to avoid flux interaction.

The load arm 52 has a landing control finger 70 extending laterally therefrom. Underlying the landing control finger 70 is a member 72 driven by a suitable actuator, not shown, to cause the load arm 52 to pivot between the loading and unloading positions.

Figure 4:
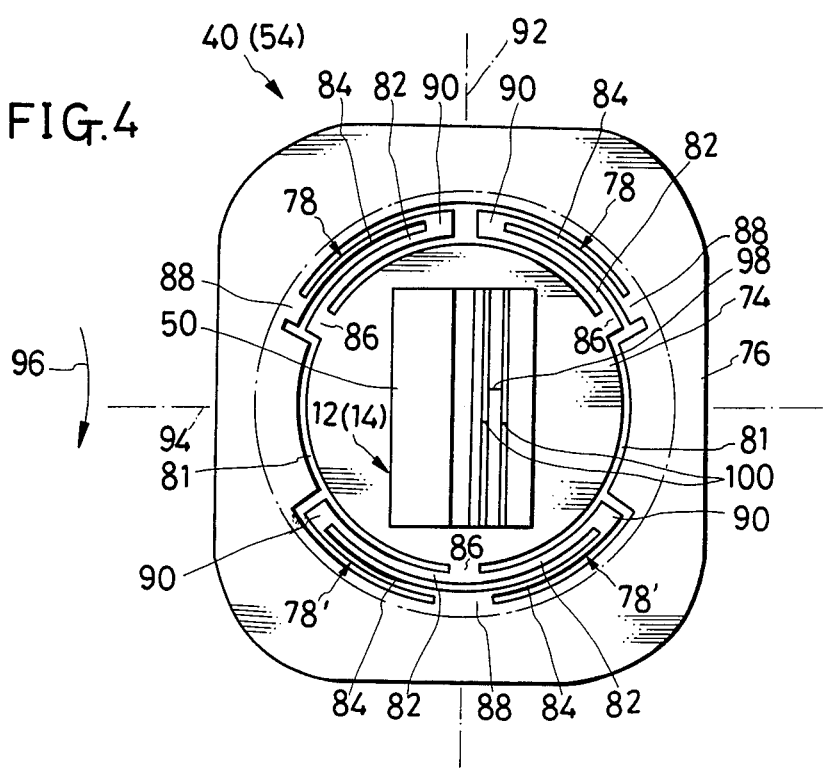
FIG. 4 is an enlarged plan view of one of the two identical flexure seats used in the apparatus of FIGS. 1 and 2, shown together with the associated transducer head mounted in position thereon.

We will now proceed to the detailed discussion of the flexure seats 40 and 54 resiliently supporting the transducer heads 12 and 14 in accordance with our invention. FIG. 4 shows on a greatly enlarged scale the flexure seat 40 for the lower transducer head 12, it being understood that the other flexure seat 54 is of identical make. Fabricated from resilient sheet metal material, preferably beryllium copper, the representative flexure seat 40 comprises a central portion 74 of circular shape, a peripheral portion 76 surrounding the central portion with a spacing therebetween, and a plurality of, four in this particular embodiment, bridge portions 78 interposed between the central and peripheral portions for interconnecting them at points angularly spaced from one another about the geometrical center or axis of the central portion. The central portion 74 has the transducer head 12 fixedly mounted thereon, as shown also in FIG. 5, and the peripheral portion 76 is affixed to the carriage 38 by being engaged in a top end enlargement 80, FIG. 5, of the stepped hole 42. For firmly carrying the transducer head 12, the central portion 74 is apertured to permit part of the head to extend downwardly therethrough, and the head is further secured to the central portion by means of an adhesive.

The four bridge portions employed in this particular embodiment may be thought of as consisting of two pairs, designated 78 and 78', although the four bridge portions are all of essentially identical design. A pair of arcuate slits 81 extend between the two pair of bridge portions 78 and 78' in order to isolate the central portion 74 and peripheral portion 76 from each other at other than the points where they are interconnected by the bridge portions in a manner set forth hereafter.

Each bridge portion 78 or 78' comprises a first or inner deflective strip 82 and a second or outer deflective strip 84. These deflective strips 82 and 84 are both of arcuate shape and of approximately the same length, extending along the periphery of the central portion 74 in parallel spaced relation to each other through an angle of approximately 60 degrees about the center of the central portion 74. The inner deflective strip 82 has its first extremity joined to the central portion 74 via an anchor portion 86 extending radially of the central portion to a relatively short extent. The outer deflective strip 84 has its first extremity joined to the peripheral portion 76 via a relatively short anchor portion 88 extending radially of the central portion 74 in alignment with the anchor portion 86 of the inner deflective strip 82. The second extremities of both deflective strips 82 and 84 are interconnected via a relatively short joint portion 90 extending radially of the central portion 74.

We have stated that the bridge portions are comprised of two pairs 78 and 78'. The first pair of bridge portions 78 are disposed with the joint portions 90 of their deflective strips 82 and 84 held adjacent each other. The second pair of bridge portions 78' are disposed with the anchor portions 86 of their inner deflective strips 82 united to each other and with the anchor portions 88 of their outer deflective strips 84 also united to each other. The arrangement set forth in this paragraph, however, is not an essential, but a preferred, feature of our invention.

Figure 5:
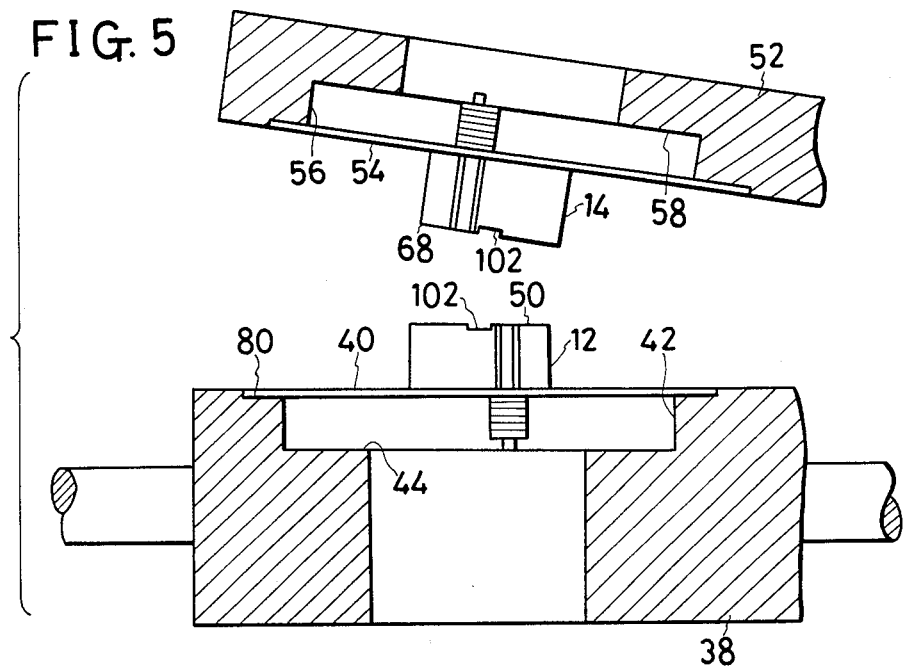
FIG. 5 is an enlarged, fragmentary elevation, partly sectioned for clarity, showing the pair of transducer heads, their flexure seats, and their carrier members, with the transducer heads being shown unloaded from the magnetic disk which is not shown here.
Figure 6:
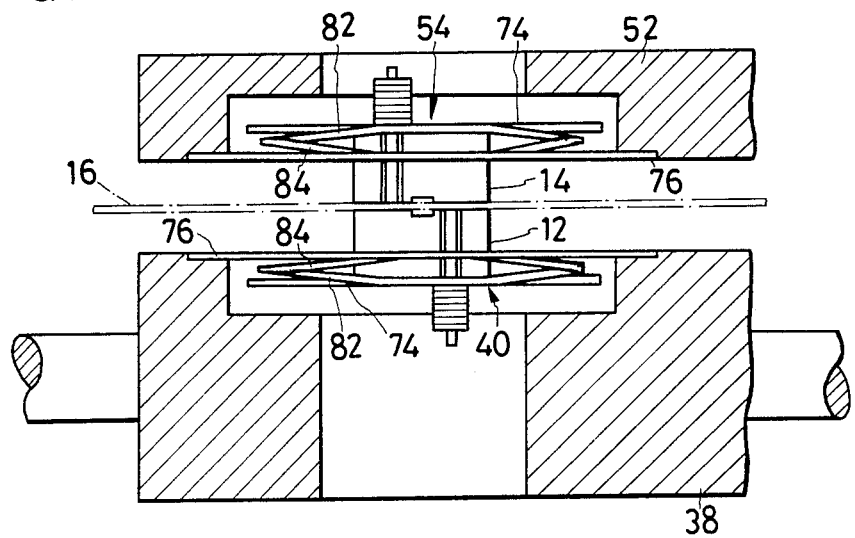
FIG. 6 is a view similar to FIG. 5 except that the transducer heads are shown loaded against the magnetic disk in order to clearly illustrate the resulting state of the flexure seats.

FIGS. 5 and 6 show the flexure seats 40 and 54 of the above described configuration mounted in position on the head carrier members 38 and 52, together with the transducer heads 12 and 14 also mounted in position on the respective flexure seats 40 and 54. When the heads 12 and 14 are not loaded against the magnetic disk 16 as in FIG. 5, the flexure seats 40 and 54 are both contained in one plane. We will refer to this plane as the principal plane of each flexure seat. The principal planes of both flexure seats 40 and 54 are parallel to the plane of the magnetic disk 16 when both transducer heads 12 and 14 are loaded against the disk as in FIG. 6.

Referring more specifically to FIG. 6, we will explain how each flexure seat 40 or 54 operates to effect displacement of the associated transducer head 12 or 14 in a direction perpendicular to the principal plane of the flexure seat, with little or no rotary displacement brought about at the same time.

When the central portion of the flexure seat 40, for example, is depressed via the lower transducer head 12 thereon, the outer deflective strip 84 of each bridge portion 78 or 78' declines in one direction from its anchor portion 88 to the joint portion 90, and from this joint portion the inner deflective strip 82 declines in the opposite direction to its anchor portion 86. As each outer deflective strip 84 swings as above about its anchor portion 88, the joint portion 90 between the outer and inner deflective strips 82 and 84 moves closer to the anchor portion 88 as seen in a plan view as in FIG. 4. Therefore, if the joint portions 90 were coupled directly to the central portion 74, with the inner deflective strips 82 eliminated, as in our experimental flexure seat set forth previously, then the central portion 74 would be displaced circumferentially upon its own vertical displacement.

No such circumferential displacement of the central portion actually takes place in the flexure seat of our invention. At the same time with the swinging of the outer deflective strips 84 about their anchor portions 88, the inner deflective strips 82 swing about their anchor portions 86. Accordingly, the joint portions 90 travel closer not only to the anchor portions 88, as above, but also to the anchor portions 86, as seen in a plan view as in FIG. 4. In other words, as seen also in FIG. 4, each associated pair of deflective strips 82 and 84 grow less in length to substantially the same extent upon vertical displacement of the central portion 74, thereby preventing the central portion from concurrent circumferential displacement.

In the use of the apparatus 10 of FIGS. 1 and 2 the magnetic disk cartridge 20 is loaded in the apparatus while the load arm 52 is in the unloading position of FIG. 1. As initially inserted in the apparatus 10, the disk cartridge 20 occupies the phantom position of FIG. 1, some distance above the top 34 of the turntable 24, and then is depressed into driven engagement with the turntable. At the same time with such engagement of the magnetic disk 16 with the turntable 24, the movable element 72 is activated to permit the load arm 52 to pivot from its FIG. 1 position to that of FIG. 2 under the bias of the springs 60 and 66, thereby causing the upper transducer head 14 to land on the magnetic disk 16.

Now the pair of transducer heads 12 and 14 have both been loaded against the magnetic disk 16 as best depicted in FIG. 6. Loaded by the torsional load spring 66, the lower transducer head 12 is depressed, causing the elastic deformation of the lower flexure seat 40, to an extent counterbalanced by the elastic deformation of the upper flexure seat 54 with the upward displacement of the upper transducer head 14 by reaction. The resulting pressures exerted by both transducer heads 12 and 14 on the magnetic disk 16 are equal, thereby assuring the favorable transfer of information between the heads and the opposite sides of the disk. It will also be appreciated that since the two flexure seats 40 and 54 are of identical make, the supporting mechanisms for both transducer heads 12 and 14 are symmetrical with respect to the plane of the magnetic disk 16.

Those skilled in the floppy disk art are well aware that the predetermined horizontal plane 36 of the magnetic disk 16 with respect to the vertical position of the lower transducer head 12 does not necessarily agree with the actual plane of the disk in commercially offered models of the disk drive apparatus because of dimensional errors that will occur in the manufacture and assemblage of the associated parts. The magnetic disk 16 is itself subject to wobbling during rotation by reason of its own flexibility. Despite such changes in the vertical position of the magnetic disk 16, the pair of transducer heads 12 and 14 will remain in good data transfer contact with the opposite sides of the disk. This is because the heads 12 and 14, both mounted on the flexure seats 40 and 54, are readily displaceable vertically and are urged against the disk under equal pressure.

The advantages accruing from these functional features will manifest themselves upon comparison of our invention with the prior art wherein either the lower transducer head has been fixed, or the two heads have been loaded against the disk under unequal pressures. Therefore, according to the prior art, the contact between the heads and the disk has been maintained by the forced deformation of the disk rather than by the resilient displacement of the transducer heads. Such forced deformation of the disk has necessitated the use of a correspondingly heavier torsional load spring than that required by our invention, inviting the rapid wear of the disk.

It is also noteworthy that the flexure seats 40 and 54 of our invention support the transducer heads 12 and 14 in a nongimbal fashion and, in consequence, in a manner free from the difficulties encountered with the conventionally gimbaled heads. We have mentioned in connection with the prior art that the gimbaled heads are susceptible to rolling and pitching, resulting in the mistracking and "sinking" of the heads to the detriment of the desired high density recording of data on the magnetic disk. No such difficulties arise with the flexure seats of our invention.

In apparatus employing a pair of transducer heads for data transfer with a double sided magnetic disk, each head must serve the additional purpose of being a pressure pad, such as that used in single head apparatus, for the other head. An attainment of this purpose requires that the contact surfaces of both heads be flat. Such flat contact surfaces are also desirable from the standpoint of the exertion of minimal pressure, per unit area of each contact surface, on the magnetic disk and hence of the reduction of disk wear. Moreover, in this type of apparatus, every part of the contact surface of each head should be loaded uniformly. Toward this end we have made the central portion 74 of each flexure seat 40 or 54 circular in shape, with the head mounted centrally on this central portion. We have further designed the flexure seat of FIG. 4 with a definite directionality in mind with respect to the rotational direction of the magnetic disk, as explained in detail hereafter.

Let us assume, for the convenience of description, that FIG. 4 represents the lower flexure seat 40 and the lower transducer head 12. The dashed line 92 in this figure extends through the center of the central portion 74 of the flexure seat 40 and is tangent to the tracks on the magnetic disk 16. The other dashed line 94, also passing the center of the central portion 74, extends radially of the magnetic disk 16. The arrow 96 indicates the rotational direction of the magnetic disk 16. The transducer head 12 has a read/write gap 98 and, on its opposite sides, a pair of erase gaps 100 arranged on its contact surface 50. The read/write gap 98 lies upstream of the erase gaps 100 with respect to the rotational direction 96 of the magnetic disk. It will also be noted that these gaps 98 and 100 are not disposed centrally but displaced toward the right hand side, as seen in FIG. 4, of the contact surface 50. As will be seen from FIGS. 5 and 6, the gaps of the upper transducer head 14 are offset toward the left hand side of its contact surface. These gap arrangements on the contact surfaces of both transducer heads 12 and 14 are intended to prevent mutual interference of the heads during data transfer and to make it possible for each head to serve as a pressure pad for the other. A shallow groove 102 is cut medianly in the contact surface 50 or 68 of each head.

Conventionally having the ceramic sliders in addition to the magnetic read/write and erase cores, the transducer head 12 is generally boxlike in shape and has the contact surface 50 of rectangular shape. This contact surface 50 is disposed lengthwise along the line 92 tangent to the disk tracks, with its geometrical center in agreement with that of the central portion 74 of the flexure seat 40. Mounted on the central portion 75 of circular shape, the boxlike head 12 cannot possibly have every part of its rectangular contact surface 50 loaded uniformly in the strict sense of the word. We have, however, succeeded in attaining the substantially uniform loading of the contact surface 50 by designing the bridge portions 78 and 78' of the flexure seat 40 as set forth hereinbelow.

The two pairs of bridge portions 78 and 78' are of bilateral symmetry with respect to the line 92. The joint portions 90 of the first pair of bridge portions 78 are held adjacent each other in a position angularly spaced 180 degrees about the center of the central portion 74 from a position where the anchor portions of the second pair of bridge portions 78' are united. Further the two deflective strips 82 and 84 of each bridge portion 78 or 78' extend arcuately through an angle of approximately 60 degrees about the center of the central portion 74. Therefore, the anchor portions 86 and 88 of the first pair of bridge portions 78 are located at angular distances of about 60 degrees in the opposite directions from the line 92, and the united anchor portions 86 and 88 of the second pair of bridge portions 78' are located on the line 92. Although the two pairs of bridge portions 78 and 78' are not symmetrical with respect to the line 94 in regard to the locations of their anchor portions 86 and 88 and joint portions 90, the general positions of these bridge portions are arranged symmetrically on both sides of the line 94.

As the anchor portions 86 and 88 of the first pair of bridge portions 78 are both located as above at the upper half, as seen in FIG. 4, of the flexure seat 40 at an angular spacing of 120 degrees from each other, and the united anchor portions 86 and 88 of the second pair of bridge portions 78' at the lower half of the flexure seat, the upper half of the central portion 74 of the flexure seat loads the corresponding upper part of the transducer head 12 to a slightly greater extent than the lower half of the flexure seat central portion loads the lower part of the transducer head. The more heavily loaded "upper" part of the transducer head 12 is directed upstream of the magnetic disk with respect to its rotational direction 96, so that the head can be maintained in more stable sliding contact with the disk than if it is loaded otherwise.

We do not wish, however, the noted difference between the head loading capabilities of the upper and lower halves of the flexure seat central portion 74 to be overestimated. Since the central portion 74 is circular in shape and is joined to the peripheral portion 76 via the bridge portions 78 and 78' having their anchor portions 86 and 88 arranged at constant angular spacings of 120 degrees, the head loading capabilities of the various parts of the central portion 74 do not differ too much, making it possible for the rectangular contact surface 50 of the transducer head 12 on the central portion 74 to be urged approximately uniformly into proper data transfer contact with the magnetic disk.

Nevertheless, speaking more strictly, the loading capability of the flexure seat 40 is the greatest and most stable at the center of its central portion 74, being equidistantly spaced from the three pairs of anchor portions 86 and 88. The loading capability is relatively unstable at those portions of the flexure seat central portion 74 which are contiguous to the line 94 and which are farthest away from the center of the central portion. However, arranged longitudinally along the line 92 at right angles with the line 94, the transducer head 12 is hardly affected by the unstable loading capabilities of these portions.

The foregoing detailed discussion of the flexure seat 40 in connection with the lower transducer head 12 substantially applies to the flexure seat 54 with the upper transducer head 14 mounted thereon. It is thus seen that both transducer heads 12 and 14 are supported in the same manner and loaded against the magnetic disk 16 under the same pressure. For this reason the data transfer characteristics of this apparatus 10 do not differ to any appreciable degree if it is used in a recumbent or upstanding attitude.

Second Form

Figure 7:
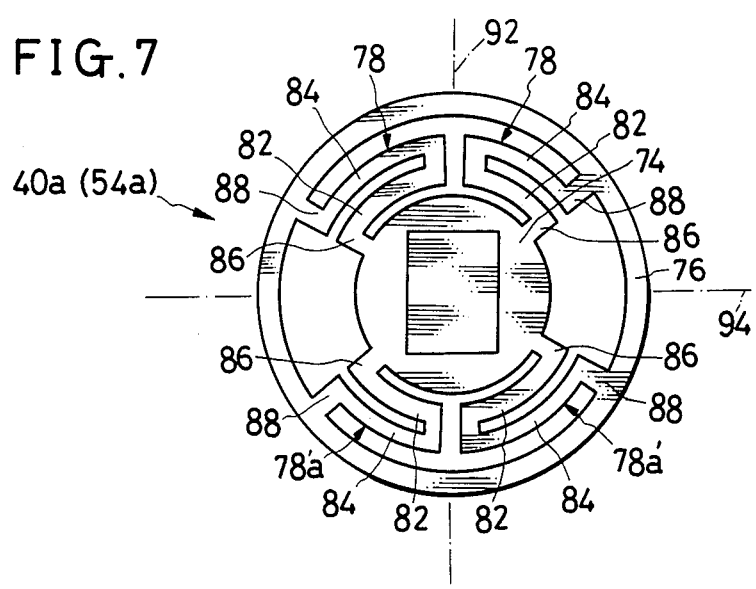
FIG. 7 is a plan view of another preferred form of the flexure seat in accordance with our invention.

The flexure seats 40 and 54 of the magnetic disk apparatus 10 are each modifiable as shown at 40a(54a) in FIG. 7. The modified flexure seat also has two pairs of bridge portions 78 and 78' a/ between the central portion 74 and the peripheral portion 76. While the first pair of bridge portions 78 are arranged just like the corresponding pair 78 of the FIG. 4 embodiment, the second pair of bridge portions 78' a differs from the corresponding pair 78' of the preceding embodiment in that their anchor portions 86 and 88 are not united but are disposed away from each other. Thus the modified flexure seat 40a(54a) is symmetrical with respect not only to the line 92 extending tangentially of the tracks on the magnetic disk but also to the line 94 extending radially of the magnetic disk. The deflective portions 82 and 84 of each bridge portion extends arcuately through an angle of approximately 60 degrees about the center of the central portion 74, so that the anchor portions 86 and 88 of each pair of bridge portions 78 or 78' are angularly spaced about 120 degrees from each other. The load distribution of the central portion 74 is symmetrical with respect to the lines 92 and 94. The advantages gained by this flexure seat 40a(54a) are substantially equivalent to those of the flexure seat 40(54).

Third Form

Figure 8:
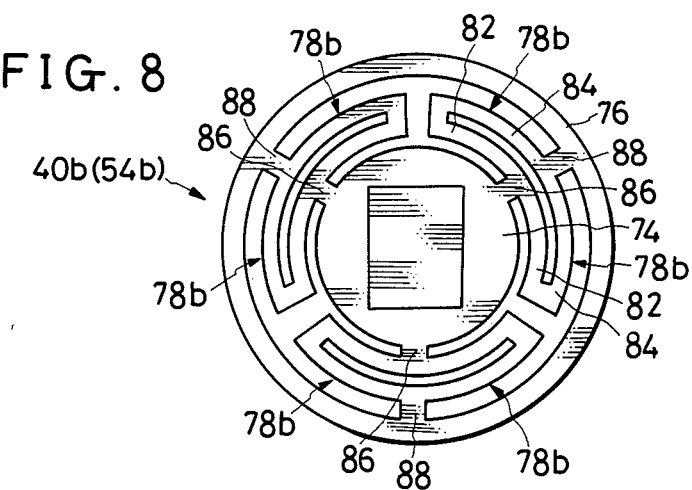
FIG. 8 is a plan view of still another preferred form of the flexure seat in accordance with our invention.

Another modified flexure seat 40b(54b) of FIG. 8 has three pairs of bridge portions 78b between the central portion 74 and the peripheral portion 76. Each pair of bridge portions 78b are disposed with the anchor portions 86 of their first deflective strips 82 united to each other, and with the anchor portions 88 of their second deflective strips 84 also united to each other. The deflective strips 82 and 84 of each bridge portion 78b extends through an angle of about 60 degrees, so that the united anchor portions 86 and 88 of the three pairs of bridge portions are disposed at constant angular spacings of about 120 degrees. The load distribution of the central portion 74 of this modified flexure seat 40b(54b) is slightly inferior to than that of the central portion 74 of the FIG. 4 or 7 embodiment, but no rotary displacement of the central portion 74 takes place by virtue of the configuration of the bridge portions 78b.

Fourth Form

Figure 9:
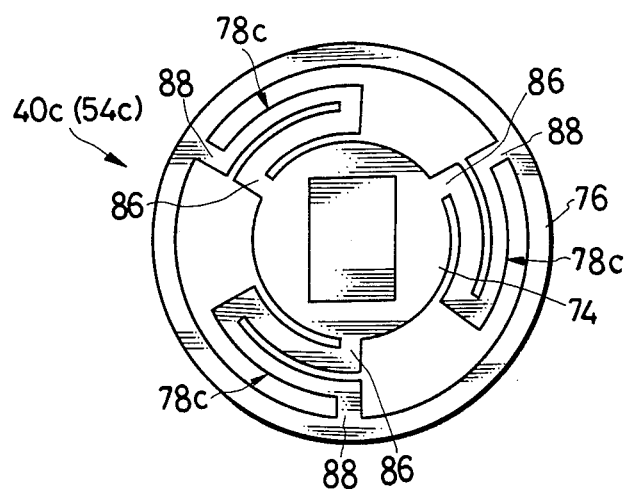
FIG. 9 is a plan view of a further preferred form of the flexure seat in accordance with our invention.

Still another modified flexure seat 40c(54c) of FIG. 9 has but three bridge portions 78c, each configured like each bridge portion of any of the foregoing embodiments, between the central portion 74 and the peripheral portion 76. The anchor portions 86 and 88 of the bridge portions 78c, aligned radially of the central portion 74, are disposed at constant angular spacings of 120 degrees. Although slightly poor in the uniformity of load distribution, this flexure seat 40c(54c) is also free from the rotary displacement of its central portion 74.

Possible Modifications

Despite the foregoing detailed disclosure, we do not wish out invention to be limited by the exact details of the illustrated embodiments, for a variety of modifications or alterations of such embodiments will occur to the skilled artisans without departing from the scope of our invention. The following is a brief list of such possible modifications or alterations:

1. Only either of the transducer heads 12 and 14 may be supported by the flexure seat of our invention, with the other head supported either rigidly or in a gimbal fashion.

2. Our invention may be applied to apparatus having but one transducer head for data transfer with a single sided magnetic disk, with the single head supported by the flexure seat of our invention.

3. The central portion of the flexure seat of our invention may be square or otherwise polygonal, rather than circular, in shape.

4. The peripheral portion of the flexure seat of our invention may be cut off at one or more points.

5. The bridge portions of the flexure seat of our invention may be placed in other than the relative locations disclosed herein in consideration of, for example, convenience in threading the leads of the transducer head through the flexure seat.

6. In apparatus having a pair of transducer heads for data transfer with a double sided magnetic disk, such as the one disclosed herein, the upper head may be mounted via the flexure seat of our invention to a carrier member movable linearly for loading and unloading the head on and from the magnetic disk, instead of to the pivotal load arm, our invention being directed to the flexure seat for resiliently supporting a transducer head on any suitable carrier member, with the principal plane of the flexure seat held parallel to the plane of the magnetic disk at least during the progress of data transfer.

7. The magnetic disk for use with our invention need not be of the illustrated type having a metal made hub and enclosed in a relatively rigid housing but can be of the more familiar type disclosed, for example, in the aforementioned Castrodale et al. U.S. Pat. No. 4,089,029.

We claim:

1. In a magnetic disk apparatus of the type having at least one transducer head mounted to a relatively rigid carrier member such as a head carriage or a load arm movable radially of a magnetic disk for data transfer between the transducer head and the magnetic disk, a flexure seat for resiliently supporting the transducer head on the carrier member, the flexure seat being made from a single piece of resilient sheet metal material and generally disposed in a principal plane which is substantially parallel to the plane of the magnetic disk at least during the progress of data transfer, the flexure seat comprising:
   (a) a central portion for having the transducer head fixedly mounted thereon;
   (b) a peripheral portion surrounding the central portion with a spacing therebetween and adapted to be secured to the carrier member;
   (c) a plurality of bridge portions interposed between the central portion and the peripheral portion for interconnecting them at points angularly spaced from one another about the geometrical center of the central portion so as to permit the transducer head on the central portion to be resiliently displaced relative to the peripheral portion only in a direction normal to the principal plane of the flexure seat, each bridge portion comprising:
      (1) a first deflective strip extending along the periphery of the central portion and anchored at a first extremity thereof to the central portion; and
      (2) a second deflective strip of approximately the same length as the first deflective strip and disposed outwardly thereof substantially in parallel relation thereto, the second deflective strip being anchored at a first extremity thereof to the peripheral portion and joined at a second extremity thereof to a second extremity of the first deflective strip;
   (d) wherein the central portion is substantially circular in shape, and wherein the first extremities of the first and second deflective strips of each bridge portion are aligned in a radial direction of the central portion; and
   (e) wherein the bridge portions are four in number, comprised of a first and second pairs of the bridge portions, the first pair of bridge portions being disposed with the second extremities of their first and second deflective strips held adjacent each other, the second pair of bridge portions being deflective strip united to each other and with the first extremities of their second deflective strips also united to each other; and
   (f) wherein the second extremities of the first and second deflective strips of the first pair of bridge portions are held adjacent each other in a position angularly displaced 180 degrees about the center of the central portion from a position where the first extremities of the first deflective strips, as well as of the second deflective strips, of the second pair of bridge portions are united to each other.

2. The flexure seat as recited in claim 1, wherein the first and second deflective strips of each bridge portion extend arcuately through an angle of approximately 60 degrees about the center of the central portion.

3. In a magnetic disk apparatus of the type having at least one transducer head mounted to a relatively rigid carrier member such as a head carriage or a load arm movable radially of a magnetic disk for data transfer between the transducer head and the magnetic disk, a flexure seat for resiliently supporting the transducer head on the carrier member, the flexure seat being made from a single piece of resilient sheet metal material and generally disposed in a principal plane which is substantially parallel to the plane of the magnetic disk at least during the progress of data transfer, the flexure seat comprising:
   (a) a central portion for having the transducer head fixedly mounted thereon;
   (b) a peripheral portion surrounding the central portion with a spacing therebetween and adapted to be secured to the carrier member;
   (c) a plurality of bridge portions interposed between the central portion and the peripheral portion for interconnecting them at points angularly spaced from one another about the geometrical center of the central portion so as to permit the transducer head on the central portion to be resiliently displaced relative to the peripheral portion only in a direction normal to the principal plane of the flexure seat, each bridge portion comprising:
      (1) a first deflective strip extending along the periphery of the central portion and anchored at a first extremity thereof to the central portion; and
      (2) a second deflective strip of approximately the same length as the first deflective strip and disposed outwardly thereof substantially in parallel relation thereto, the second deflective strip being anchored at a first extremity thereof to the peripheral portion and joined at a second extremity thereof to a second extremity of the first deflective strip;
   (d) wherein the central portion is substantially circular in shape, and wherein the first extremities of the first and second deflective strips of each bridge portion are aligned in a radial direction of the central portion; and
   (e) wherein the bridge portions are six in number, comprised of three pairs of the bridge portions, each pair of bridge portions being disposed with the first extremities of their first deflective strips united to each other and with the first extremities of their second deflective strips also united to each other.

4. The flexure seat as recited in claim 3, wherein the united first extremities of the first and second deflective strips of the three pairs of bridge portions are disposed at constant angular spacings of 120 degrees about the center of the central portion.

5. In a magnetic disk apparatus of the type having at least one transducer head mounted to a relatively rigid carrier member such as a head carriage or a load arm movable radially of a magnetic disk for data transfer between the transducer head and the magnetic disk, a flexure seat for resiliently supporting the transducer head on the carrier member, the flexure seat being made from a single piece of resilient sheet metal material and generally disposed in a principal plane which is substantially parallel to the plane of the magnetic disk at least during the progress of data transfer, the flexure seat comprising:
 (a) a central portion for having the transducer head fixedly mounted thereon;
 (b) a peripheral portion surrounding the central portion with a spacing therebetween and adapted to be secured to the carrier member;
 (c) a plurality of bridge portions interposed between the central portion and the peripheral portion for interconnecting them at points angularly spaced from one another about the geometrical center of the central portion so as to permit the transducer head on the central portion to be resiliently displaced relative to the peripheral portion only in a direction normal to the principal plane of the flexure seat, each bridge portion comprising:
  (1) a first deflective strip extending along the periphery of the central portion and anchored at a first extremity thereof to the central portion; and
  (2) a second deflective strip of approximately the same length as the first deflective strip and disposed outwardly thereof substantially in parallel relation thereto, the second deflective strip being anchored at a first extremity thereof to the peripheral portion and joined at a second extremity thereof to a second extremity of the first deflective strip;
 (d) wherein the central portion is substantially circular in shape, and wherein the first extremities of the first and second deflective strips of each bridge portion are aligned in a radial direction of the central portion; and
 (e) wherein the bridge portions are three in number and are disposed at constant angular spacings about the center of the central portion.

* * * * *